United States Patent
Lee et al.

(10) Patent No.: US 8,250,913 B2
(45) Date of Patent: Aug. 28, 2012

(54) SYSTEM FOR CALCULATING SCR CONVERSION EFFICIENCY FOR DIESEL VEHICLES AND METHOD THEREOF

(75) Inventors: Kang Won Lee, Seongnam (KR); Jungwhun Kang, Yongin (KR)

(73) Assignee: Hyundai Motor Company, Seoul (KR)

( * ) Notice: Subject to any disclaimer, the term of this patent is extended or adjusted under 35 U.S.C. 154(b) by 492 days.

(21) Appl. No.: 12/512,825

(22) Filed: Jul. 30, 2009

(65) Prior Publication Data

US 2010/0139380 A1    Jun. 10, 2010

(30) Foreign Application Priority Data

Dec. 5, 2008    (KR) .................. 10-2008-0123565

(51) Int. Cl.
*G01M 15/10*    (2006.01)
(52) U.S. Cl. .................................. 73/114.75
(58) Field of Classification Search ............... 73/114.69, 73/114.75
See application file for complete search history.

(56) References Cited

U.S. PATENT DOCUMENTS

| | | | |
|---|---|---|---|
| 6,742,326 B2 * | 6/2004 | Xu et al. | 60/284 |
| 6,928,359 B2 * | 8/2005 | Xu et al. | 701/102 |
| 7,114,326 B2 * | 10/2006 | Mukaihira et al. | 60/277 |
| 7,858,060 B2 * | 12/2010 | Gady et al. | 423/213.5 |
| 8,091,350 B2 * | 1/2012 | Suzuki | 60/301 |
| 8,091,416 B2 * | 1/2012 | Wang et al. | 73/114.75 |
| 2004/0206069 A1 * | 10/2004 | Tumati et al. | 60/285 |
| 2008/0178575 A1 * | 7/2008 | Shaikh et al. | 60/274 |
| 2010/0043400 A1 * | 2/2010 | Wang et al. | 60/276 |
| 2011/0023456 A1 * | 2/2011 | Levijoki et al. | 60/274 |
| 2011/0061363 A1 * | 3/2011 | Levijoki et al. | 60/273 |
| 2011/0296905 A1 * | 12/2011 | Bastoreala et al. | 73/114.75 |

* cited by examiner

Primary Examiner — Freddie Kirkland, III
(74) Attorney, Agent, or Firm — Morgan, Lewis & Bockius LLP

(57) ABSTRACT

A system for and process of is provided for calculating SCR conversion efficiency by applying a reference control signal by which a urea dosing module is controlled to an NOx conversion value respectively in absorption and release modes of NH3 according to a loading amount of the NH3 determined from the SCR efficiency map. The system and process may include a process of determining the NOx conversion value according to a loading amount of NH3, a process of detecting the reference control signal of the dosing module injecting the urea solution, and a process of calculating the SCR conversion efficiency based on the determined NOx conversion value and reference control signal of the dosing module.

8 Claims, 4 Drawing Sheets

SYSTEM FOR CALCULATING SCR CONVERSION EFFICIENCY FOR DIESEL VEHICLES AND METHOD THEREOF

CROSS-REFERENCE TO RELATED APPLICATION

The present application claims priority to Korean Patent Application Number 10-2008-0123565 filed on Dec. 5, 2008, the entire contents of which application is incorporated herein for all purposes by this reference.

BACKGROUND OF THE INVENTION

1. Field of the Invention

The present invention relates to a system for calculating SCR conversion efficiency for diesel vehicles, and a method thereof. More particularly, the present invention relates to a system for calculating SCR conversion efficiency for diesel vehicles and a method thereof that calculate the SCR conversion efficiency by applying a reference control signal by which a urea dosing module is controlled to NOx conversion values respectively in absorption and release modes of NH3 according to a loading amount of the NH3 determined from a selective catalytic reduction (SCR) efficiency map.

2. Description of Related Art

Diesel vehicles are provided with various post-processing apparatus for removing NOx, CO, THC, soot, particulate matter (PM), and other noxious materials contained in exhaust gas in order to meet Tier2 BIN5 standards or EURO 6 standards.

An SCR uses NH3 that is decomposed from a urea solution as a reducing agent for purifying the NOx. The NH3 has very superior selectivity for the NOx, and a reaction is prompted between the NOx and the NH3 when O2 exists.

The reaction between the NOx and the NH3 is as follows.

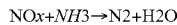

NOx+*NH3*→N2+H2O

The dosing module injects the urea solution in order to maintain SCR conversion efficiency higher than a predetermined level, and a target amount of the NH3 generated through evaporation and dissolution of the urea solution is loaded within the SCR.

Generally, the SCR conversion efficiency is increased as an injection amount of the urea solution increases, but the generated NH3 is not dissolved or is exhausted into the air without reacting with the NOx when the urea solution exceeding a predetermined amount is injected. Therefore, the environment is contaminated worse than before.

Particularly, the quality of a vehicle is deteriorated when the excessively generated NH3 is exhausted into the air through an exhaust pipe.

Therefore, it is very important for the SCR conversion efficiency to be more precisely calculated such that the injection amount of the urea solution is controlled.

As shown in FIG. 4, in conventional diesel vehicles, the SCR conversion efficiency value is calculated according to an average value of NOx conversion values in an absorption mode A1 of the NH3 when the urea solution is injected, and in an release mode B1 of the NH3 when the urea solution is not injected from an SCR efficiency map established according to a loading amount of NH3, which represents absorbed amount of the NH3 in the SCR.

For example, since the NOx conversion value X1 in the absorption mode A1 is 90% and the NOx conversion value Y1 in the release mode B1 is 60% in the SCR efficiency map when the temperature of the SCR is 225° C. which is an activation temperature and the loading amount of the NH3 is 1% (1000 mg), the SCR conversion efficiency Z1 may be 75% that is an average value of the NOx conversion value in the absorption and release modes.

Such conventional methods have a vast difference from an actual SCR conversion efficiency if the urea solution is injected or not. Therefore, when the average value is assumed as the SCR conversion efficiency, safety and reliability of actual SCR control cannot be guaranteed and the SCR conversion efficiency cannot be calculated from a characteristic change according to an intermittent control of the dosing module.

In other words, according to a conventional method for calculating the SCR conversion efficiency, a PWM signal of 50% for controlling the dosing module is applied, and therefore there may be a large error from the actual SCR conversion efficiency generated in the SCR.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a system for calculating SCR conversion efficiency for diesel vehicles, and a method thereof, having advantages of preventing a slip of the NH3 and enhancing purifying performance of the NOx as a consequence that actual SCR conversion efficiency is calculated by multiplying a reference control signal to NOx conversion values in absorption and release modes of NH3 according to a loading amount of NH3 determined from an SCR efficiency map.

In one aspect of the present invention, the system for calculating SCR conversion efficiency for diesel vehicles may include, an engine, a catalyst purifying NOx through a reduction reaction of NOx contained in exhaust gas generated in the engine with NH3, a dosing module injecting a urea solution to a front region of the catalyst, and a controller determining NOx conversion value according to a loading amount of the NH3 respectively in absorption and release modes of the NH3, and calculating the SCR conversion efficiency based on the determined NOx conversion value and a reference control signal of the dosing module.

In another aspect of the present invention, the method for calculating SCR conversion efficiency for diesel vehicles may include, determining an NOx conversion value according to a loading amount of NH3 in absorption and release modes of the NH3, detecting a reference control signal of a dosing module that injects a urea solution, and calculating SCR conversion efficiency of the catalyst based on the determined NOx conversion vale and the reference control signal of the dosing module.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
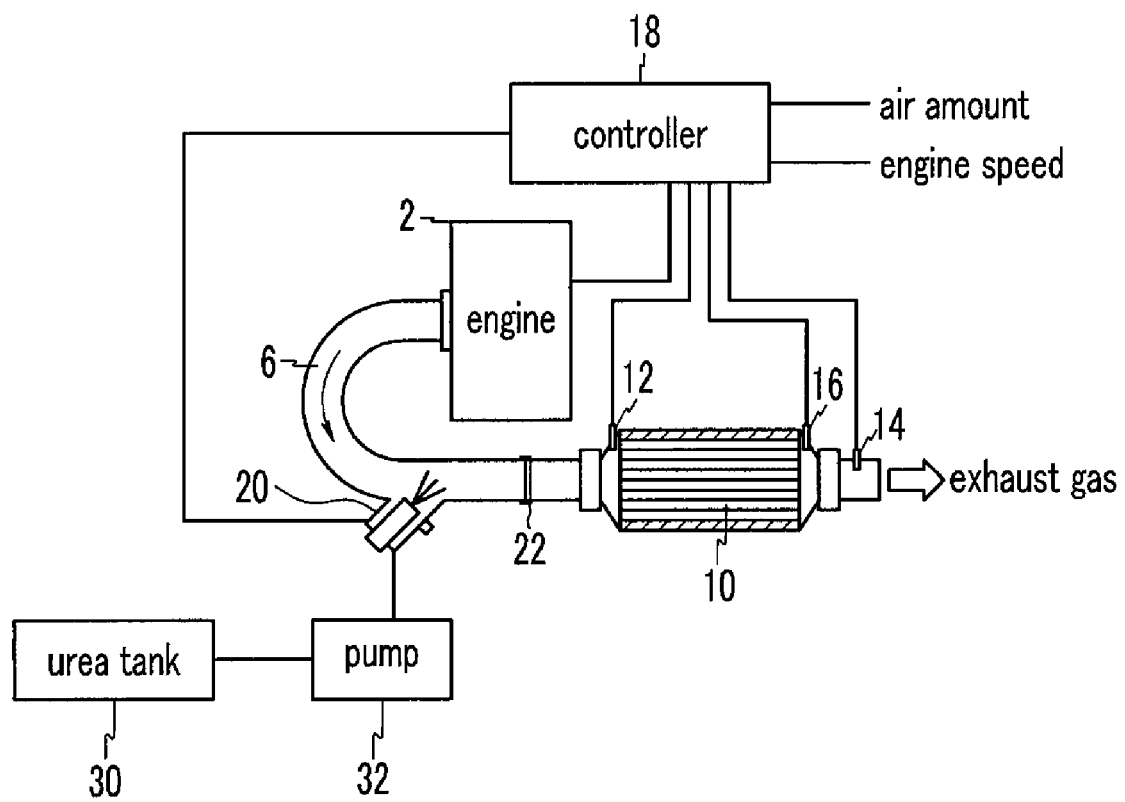
FIG. 1 is a schematic diagram of an exemplary system for calculating SCR conversion efficiency for diesel vehicles according to the present invention.
Figure 2:
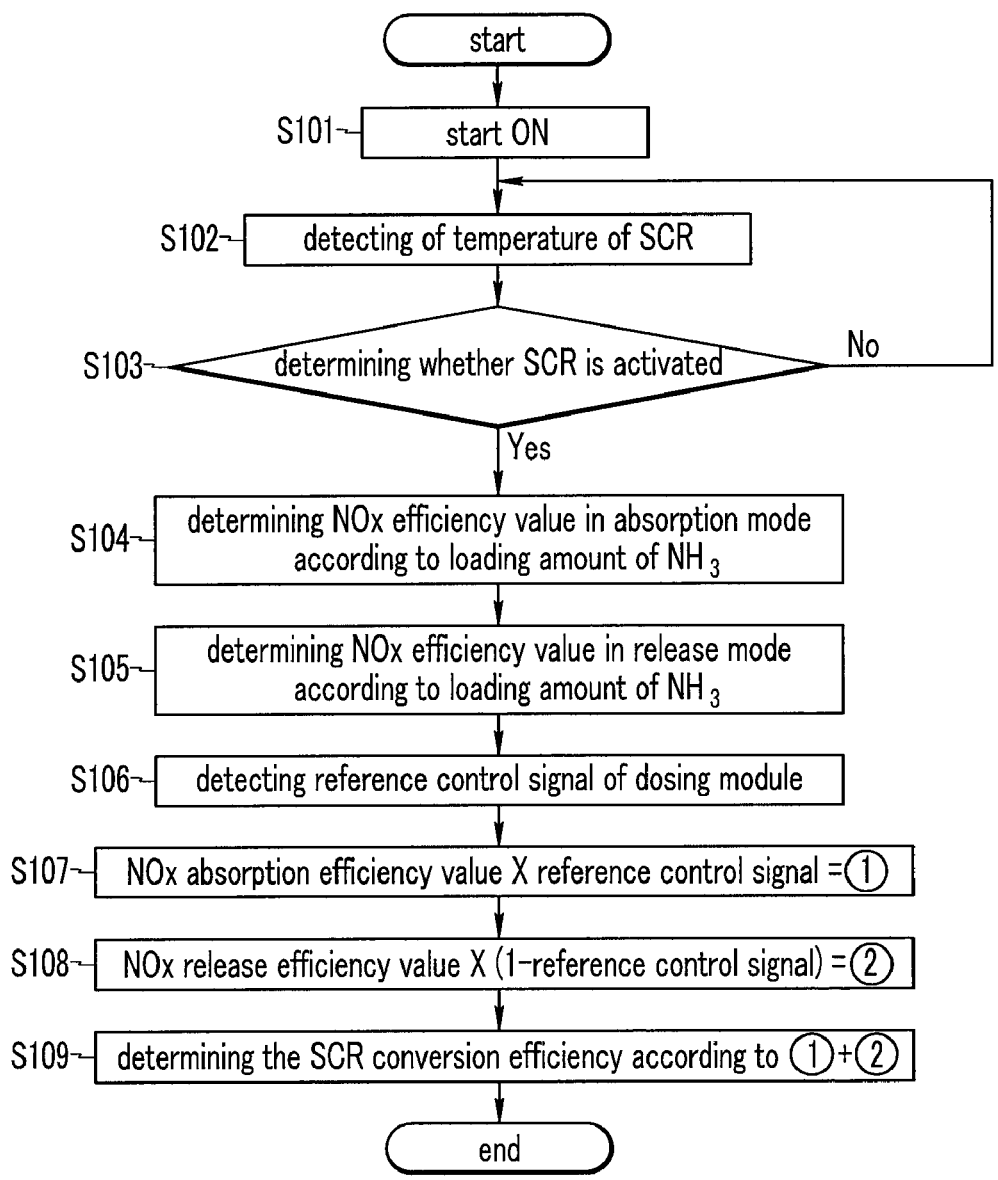
FIG. 2 is a flowchart of an exemplary method for calculating SCR conversion efficiency for diesel vehicles according to the present invention.

FIG. 1 is a schematic diagram of a system for calculating SCR conversion efficiency for diesel vehicles according to various embodiments of the present invention.

A system for calculating SCR conversion efficiency according to various embodiments of the present invention includes an engine 2 as a power source, an exhaust pipe 6 exhausting exhaust gas burned in the engine, an SCR 10, a first NOx sensor 12, a second NOx sensor 14, a temperature sensor 16, a controller 18, a dosing module 20, a mixer 22, a urea tank 30, and a pump 32.

The SCR 10 is positioned at a predetermined position of the exhaust pipe 6, and consists of $V_2O_5/TiO_2$ that is $V_2O_5$ carried by $TiO_2$, $Pt/Al_2O_3$ that is Pt carried by $Al_2O_3$, or a zeolite catalyst. The SCR 10 loads the NH3 generated from the urea solution injected from the dosing module 20, and purifies the NOx through a reaction of the NH3 and the NOx.

The first NOx sensor 12 is positioned at an entrance side of the SCR 10, detects NOx amount contained in the exhaust gas flowed into the SCR, and transmits information corresponding thereto to the controller 18.

The second NOx sensor 14 is positioned at an exit side of the SCR 10, detects NOx amount contained in the exhaust gas purified through a reduction reaction of the SCR 10, and transmits information corresponding thereto to the controller 18.

The temperature sensor 16 detects temperature of the SCR 10 that is activated by exhaust gas temperature, and transmits information corresponding thereto to the controller 18.

The controller 18 determines NH3 amount loaded within the SCR 10 based on the temperature of the SCR 10 detected by the temperature sensor, and determines the NO2 amount and the NOx amount flowed into the SCR 10 based on the NOx amounts detected by the first and second NOx sensors 12 and 14.

Also, the controller 18 determines an NOx conversion value in an absorption mode of the NH3 from a determined SCR efficiency map (refer to FIG. 3) according to the loading amount of the NH3 in an activation condition of the SCR 10 based on the loading amount of the NH3 within the SCR 10.

In addition, the controller 18 determines NOx conversion value in a release mode of the NH3 based on the loading amount of the NH3 within the SCR 10, calculates actual SCR conversion efficiencies in respective modes by multiplying a reference control signal for operating the dosing module 20 to respective NOx conversion values, and calculates a final SCR conversion efficiency by adding the actual SCR conversion efficiencies in respective modes.

The controller 18 calculates the SCR conversion efficiency f from Equation 1.

$$f = px + q(1-x) \qquad \text{Equation 1}$$

Herein, p is the NOx conversion value in the absorption mode of the NH3, q is the NOx conversion value in the release mode of the NH3, and x is the reference control signal of the dosing module.

Also, the reference control signal of the dosing module 20 is determined according to at least one of the NOx amount contained in the exhaust gas flowing into the SCR 10, the NH3 amount loaded in the SCR 10, a ratio of NO2 to NOx in the front region of the SCR 10, and the temperature of the SCR 10.

Subsequently, the controller 18 generates an actual control signal according to the SCR conversion efficiency for controlling an injection amount of the urea solution and the dosing module 20, and optimally controls the injection of the urea solution.

The mixer 22 is positioned between the dosing module 20 and the SCR 10, and splits particles of the urea solution injected through the doing module 20 by colliding them into each other.

The urea tank 30 accommodates the urea solution. The pump 32 pressurizes the urea solution supplied to the dosing module 20 from the urea tank 30 to a predetermined pressure, and then supplies the urea solution at a high pressure to the dosing module 20 when the dosing module 20 is worked according the actual control signal.

An exemplary method for calculating SCR conversion efficiency for diesel vehicles will be described in detail.

When the engine 2 is started, the controller 18 controls an operation of the engine according to information about air amount, engine speed, and engine load, and determines whether the SCR 10 is activated by detecting the temperature of the SCR 10 through the temperature sensor 16 at steps S102 and S103.

If the SCR 10 is activated, the controller 18 determines the NOx efficiency value respectively in the absorption and release modes according to a loading amount of the NH3 from the determined SCR efficiency map at steps S104 and S105.

Further, the controller 18 detects the reference control signal x of the dosing module 20 controlling the injection amount of the urea solution at step S106. Subsequently, the controller 18 calculates the SCR conversion efficiency in the absorption mode of the NH3 based on the NOx absorption efficiency value p and the reference control signal x of the dosing module 20, and calculates the SCR conversion efficiency in the release mode of the NH3 based on the NOx release efficiency value q and the reference control signal x of the dosing module 20 at step S108.

The controller 18 adds the respective SCR conversion efficiencies in the absorption and release modes, and determines the actual SCR conversion efficiency f of the SCR 10 from the equation 1 at step S109. In addition, the controller 18 calculates the actual control signal of the dosing module 20 for determining the injection amount of the urea solution based on the actual SCR conversion efficiency f and controls the dosing module 20 according to the actual control signal.

Accordingly, a slip of the NH3 may not be generated, and an optimal purifying performance of the NOx may be ensured because urea corresponding to a necessary NH3 amount is injected in the dosing module 20 at step S109.

Figure 3:
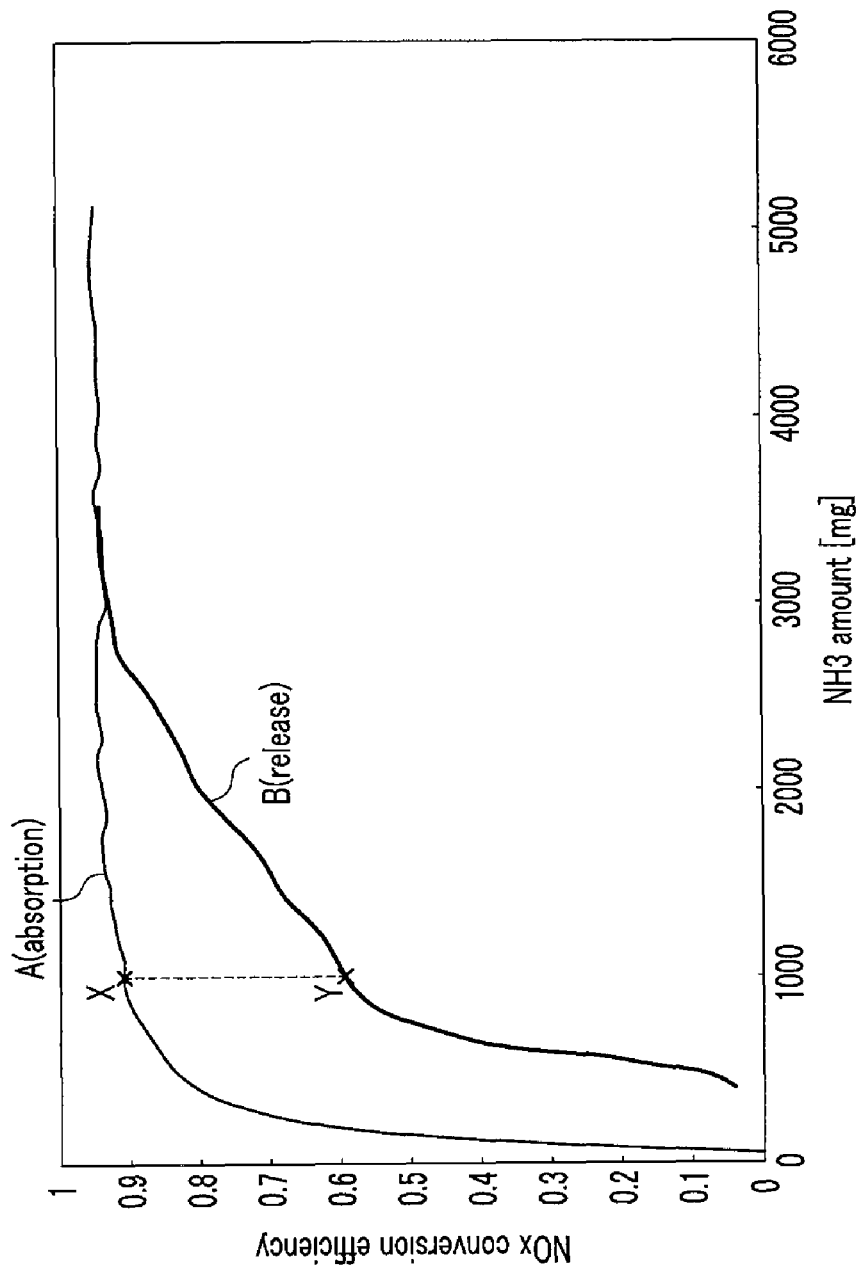
FIG. 3 is a diagram showing an exemplary characteristic of SCR conversion efficiency for diesel vehicles according to the present invention.
Figure 4:
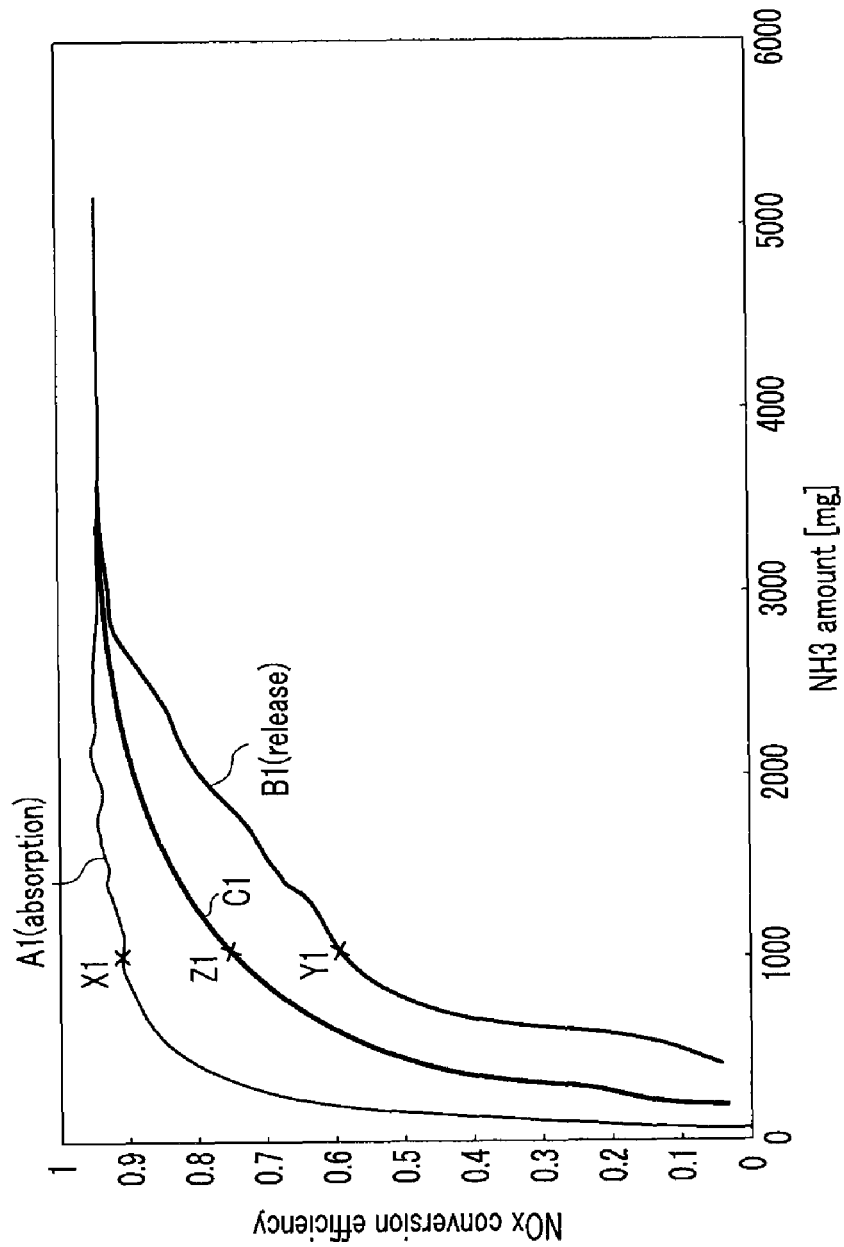
FIG. 4 is a diagram of an exemplary map table showing SCR conversion efficiency guess for diesel vehicles according to the present invention.

For example, if the temperature of the SCR 10 is 225° C., which is the activation temperature, the loading amount of a NH3 is 1% (1000 mg) and the reference control signal of the dosing module 20 is 30%, the NOx conversion value X is 90% in the absorption mode A of the NH3, and the NOx conversion value Y is 60% in the release mode B of the NH3 from the determined SCR efficiency map as shown in FIG. 3.

Accordingly, the controller 18 calculates actual SCR conversion efficiencies in the absorption and release modes by multiplying a reference control signal of the dosing module to respective NOx conversion values, and calculates a final SCR conversion efficiency by adding the actual SCR conversion efficiencies in respective modes.

Therefore, SCR conversion efficiency is calculated as 0.9×0.3+0.6×0.7=0.69 in the condition that the temperature of the SCR 10 is 225° C., which is the activation temperature, the loading amount of a NH3 is 1% (1000 mg), and the reference control signal of the dosing module 20 is 30%.

According to various embodiments of the present invention, the SCR conversion efficiency is precisely calculated. Therefore, consumption of the urea solution may be minimized and optimal purifying performance of the NOx may be ensured.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A system for calculating SCR conversion efficiency for diesel vehicles, comprising:
    an engine;
    a catalyst purifying NOx through a reduction reaction of NOx contained in exhaust gas generated in an engine with NH3;
    a dosing module injecting urea solution to a front region of the catalyst; and
    a controller determining a NOx conversion value according to a loading amount of the NH3 respectively in absorption and release modes of the NH3, and calculating the SCR conversion efficiency based on the determined NOx conversion value and a reference control signal of the dosing module.

2. The system of claim 1, wherein the controller determines the SCR conversion efficiency f from an equation $f=px+q(1-x)$,
    wherein p is the NOx conversion value in the absorption mode of the NH3, q is the NOx conversion value in the release mode of the NH3, and x is the reference control signal of the dosing module.

3. The system of claim 2, wherein the reference control signal of the dosing module is determined according to at least one of NOx amount contained in the exhaust gas flowing into the catalyst, NH3 amount loaded in the catalyst, a ratio of NO2 to NOx in the front region of the catalyst, and temperature of the catalyst.

4. The system of claim 1, wherein the controller generates an actual control signal according to the SCR conversion efficiency for controlling injection of the urea solution and the dosing module in order to optimally control the injection of the urea solution.

5. A method for calculating SCR conversion efficiency for diesel vehicles, comprising:
    determining NOx conversion value according to a loading amount of NH3 in absorption and release modes of the NH3 respectively;
    detecting a reference control signal of a dosing module that injects a urea solution; and
    determining the SCR conversion efficiency of the catalyst based on the determined NOx conversion vale and the reference control signal of the dosing module.

6. The method of claim 5, wherein the SCR conversion efficiency f is calculated from an equation $f=px+q(1-x)$,
    wherein p is the NOx conversion value in the absorption mode of the NH3, q is the NOx conversion vale in the release mode of the NH3, and x is the reference control signal of the dosing module.

7. The method of claim 6, wherein the reference control signal of the dosing module is determined according to at least one of NOx amount in exhaust gas flowing into the catalyst, NH3 amount loaded in the catalyst, a ratio of NO2 to NOx in a front region of the catalyst, and temperature of the catalyst.

8. The method of claim 5, further comprising generation of an actual control signal according to the SCR conversion efficiency for controlling injection of the urea solution and the dosing module in order to optimally control the injection of the urea solution.

* * * * *